United States Patent [19]
Bernacki et al.

[11] Patent Number: 6,036,324
[45] Date of Patent: Mar. 14, 2000

[54] CATADIOPTRIC ZOOM SCATTERING COLLECTOR

[75] Inventors: Bruce E. Bernacki, Layton, Utah; Arthur C. Miller, Jr., Knoxville; Robert J. Nuspliger, Oak Ridge, both of Tenn.

[73] Assignees: Lockheed Martin Energy Research Corp; Lockheed Martin Energy Systems, Inc., both of Oak Ridge; Environmental Systems Corporation, Knoxville, all of Tenn.

[21] Appl. No.: 08/932,403

[22] Filed: Sep. 17, 1997

[51] Int. Cl.$^7$ .............................. G02B 5/10; G02B 17/00
[52] U.S. Cl. .......................... 359/859; 359/366; 359/425
[58] Field of Search ..................... 359/362, 425, 359/364–366, 353–357, 725–732, 856–861; 356/336, 338

[56] References Cited

U.S. PATENT DOCUMENTS

| | | | |
|---|---|---|---|
| 3,527,526 | 9/1970 | Silvertooth | 359/859 |
| 4,439,012 | 3/1984 | Christy | 359/859 |
| 4,619,502 | 10/1986 | Bagby | 359/366 |
| 4,746,205 | 5/1988 | Cross et al. | 359/859 |
| 5,144,476 | 9/1992 | Kebo | 359/859 |
| 5,212,588 | 5/1993 | Viswanathan et al. | 359/859 |
| 5,329,347 | 7/1994 | Wallace et al. | 359/425 |

*Primary Examiner*—Thong Nguyen
*Attorney, Agent, or Firm*—Quarles & Brady LLP

[57] ABSTRACT

A back scattering collector, comprising: a first spherical reflective surface; a second spherical reflective surface having an annular form defining a central aperture; a refractive element, the first and second reflective surfaces and the refractive element being aligned along an optical axis; a light excitation source for illuminating a volume for analysis; the first and second reflective surfaces having respective diameters which reflect light rays back scattered from the volume at least three times between the first and second reflective surfaces, a last one of the at least three refections directing the light rays through the refractive element; and, a photo detector, the refractive element focusing the light reflected light rays onto the photo detector. The second reflective surface can be formed on the convex side of a plano-convex lens, the refractive element being formed by a central portion of the lens. The distance between the reflective surfaces is adjustable.

17 Claims, 4 Drawing Sheets

CATADIOPTRIC ZOOM SCATTERING COLLECTOR

BACKGROUND OF THE INVENTION

1. Field of the Invention

This invention relates to the field of optical scattering collectors, and in particular, to zoom scattering collectors employed for inferring particle mass concentration based upon light scattered from particulates.

2. Description of Related Art

The stack emissions and effluent of industrial processes must be monitored in order to effect appropriate pollution control. Optical scattering instruments have been employed that can infer particle mass concentration based upon the characteristics of light scattered from the particulates in the stack emissions and effluent. A back-scattering arrangement is generally preferred to minimize the number of stack penetrations. In such an arrangement, a collimated quasi-monochromatic optical source is directed toward the measurement volume, and an optical collection system is used to collect light scattered in the backwards direction within a range of angles exclusive of the angle of specular reflection.

The probed volume must be large enough to obtain adequate scattering statistics to accurately infer mass concentration. Moreover, the instrument must have a sharp cutoff to reject light scattered by any windows of the instrument and, most importantly, light scattered by the far wall of an emission stack.

Optical systems are, by their nature, collinear devices to the first order. Ideally, optical devices map points into points, lines into lines and planes into planes, from object space into their conjugates in image space. Real lenses deviate from this ideal, especially when aberrations of the optical elements are present.

One approach to an instrument of this type is a simple lens having a central obscuration. The diameter of the obscuration determines the angular spread of rays that the system will admit. Another attribute of this simple system in addition to angular selectivity is the ability to probe a volume in space. This ability is limited in such a simple single lens system because, as noted above, an ideal optical system maps points, lines and planes in object space into conjugate points, lines and planes in image space. The instrument must have significant optical aberrations to obtain a volume probe, most notably, spherical aberration. The characteristic due to spherical aberration that can be exploited is its indistinct line focus, or caustic, in which different zones of the lens image different object points along the optical axis onto the desired image point. An extreme example of a system with only spherical aberration is one that contains axicon elements. However, axicons are difficult to manufacture using methods other than deterministic approaches, such as single-point diamond turning or computer-controlled grinding. Moreover, a reflective design is highly desirable for other reasons. Firstly, reflective optics are wavelength insensitive. Secondly, reflective optics can be more compact than refractive systems since, for a given curvature, reflective optics have greater power.

Catadioptric telescopes, for example a Schmidt-Cassegrain astronomical telescope including both reflective and refractive optics, have been modified for dual-beam laser Doppler velocimetry. The telescope in a laser Doppler velocimeter must focus two Gaussian-profile laser beams at an intersection. The probe volume is defined by the area between the two intersecting laser beams and only the light back scattered from this relatively small probe volume must be collected for final focusing into a photo detector. In mass concentration measurements, of the type required for monitoring particulate stack emissions and effluent, a line of particles is illuminated and a scattering volume as large as possible must be collected. Accordingly, such a catadioptric design is not useful for monitoring particulates in stack emissions and effluent.

Therefore, a long felt need has existed for a new reflective back scattering collector which is particularly appropriate for monitoring particulates in stack emissions and effluent and which is relatively inexpensive to manufacture.

SUMMARY OF THE INVENTION

A back scattering collector in accordance with an inventive arrangement comprises: a first spherical reflective surface; a second spherical reflective surface having a generally annular form, the annular form defining a non reflective central aperture; a refractive element disposed in the central aperture, the first and second reflective surfaces and the refractive element being aligned along an optical axis; a light excitation source for illuminating a volume for analysis; the first and second reflective surfaces having respective diameters which reflect light rays back scattered from the volume at least three times between the first and second reflective surfaces, a last one of the at least three reflections directing the light rays through the refractive element; and, a photo detector, the refractive element focusing the light reflected light rays onto the photo detector.

The geometry of the collector can be described in one or more different ways, including but not limited to the following. The first and second reflective surfaces and the refractive element have respective centers of curvature lying substantially on the axis. The first and second reflective surfaces have respective centers of curvature on a side of the second reflective surface opposite the first reflective surface. The diameter of the first reflective surface is substantially twice as long as the diameter of the second reflective surface.

In a presently preferred embodiment, the collector advantageously comprises a plano-convex lens having plane and convex sides. The second reflective surface is formed on the convex side of the lens and the refractive element is formed by a central portion of the lens.

In a presently preferred embodiment, the collector further comprises means for adjusting a separation distance between the first and second reflective surfaces.

The excitation source comprises a laser, for example a semiconductor laser.

DETAILED DESCRIPTION OF THE PREFERRED EMBODIMENTS

Figure 1:
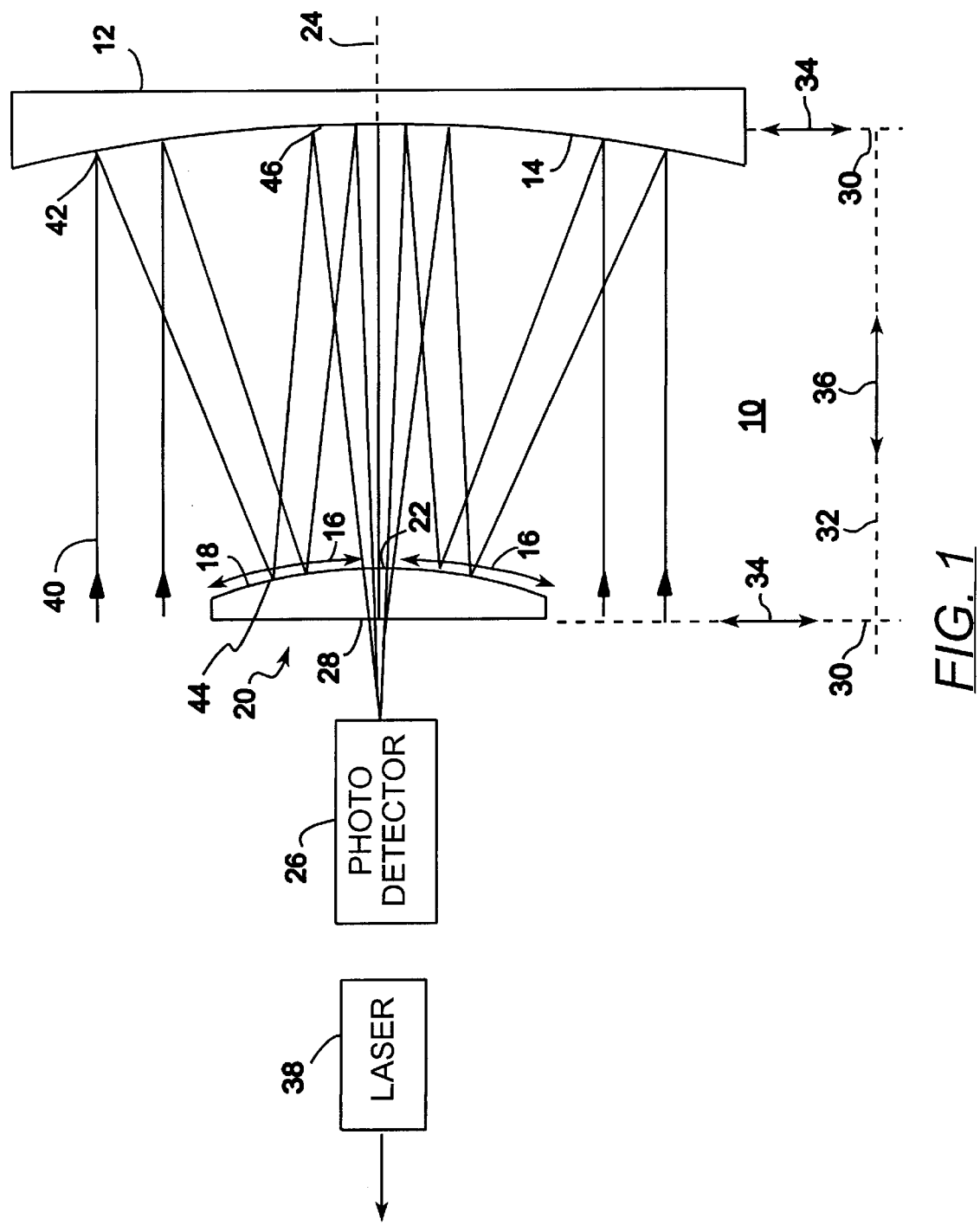
FIG. 1 is a diagrammatic layout of the optical system for a multiple bounce catadioptric zoom scattering collector in accordance with the inventive arrangement.

A catadioptric zoom scattering collector is shown diagrammatically in FIG. 1 and generally designated by reference numeral 10. The collector 10 comprises a first or primary mirror 12 having a first spherical reflecting surface 14 and a second spherical reflecting surface 16 formed on the convex surface 18 of a piano-convex lens 20 and forming a secondary mirror.

The secondary mirror can be fabricated by evaporative coating a suitably reflective metal, for example gold, onto the convex surface 18 of the plano-convex lens 20. A small central aperture 22 is left clear so that light can be brought to a focus onto the surface of a photo detector 26 mounted in front of the system along the optical axis. The central aperture 22 of the convex surface 18 has a small amount of refractive power. The second spherical reflecting surface, or secondary mirror, is therefore generally annular in shape. The first and second reflecting surfaces and the small refractive lens are centered on a common axis 24. It can also be seen that the plano-convex lens 20 partially obscures the first reflecting surface 14 with regard to back scattered light approaching the collector from the left in the orientation of FIG. 1.

Alternatively, the secondary mirror need not be formed on a lens and instead can be an annular member. The refractive element would then be a separate element, aligned with the central aperture. The separate element could be outside the aperture or fully or partially within the aperture.

The volume to be probed can be illuminated with a laser 38, for example a 780 nanometer (nm) semiconductor laser beam, that is collimated and also aligned along the optical axis 24 in front of the scattering collector 10 and a photo detector 26.

In the presently preferred embodiment, the primary mirror is a fast F/1 concave spherical reflector having a diameter of, for example, 152.4 millimeters (mm). The primary mirror reflects the collected light toward the slower secondary mirror formed by the second reflecting surface 16. The partially reflective plano-convex lens and the secondary mirror formed thereon have a diameter of, for example, 76.2 mm. A typical back scattered light ray 40 is received by the collector. Light ray 40 undergoes a first reflection 42 by the primary mirror toward the secondary mirror. Light ray 40 then undergoes a second reflection 44 back toward the primary mirror. Finally, light ray 40 undergoes a third reflection 46 back toward the uncoated part 22 of the plano-convex lens 20, which focuses the light ray 40 onto the photo detector 26 which is positioned to the rear of the plane surface 28 of the lens, for example, 10 mm.

The photo detector 26 can have an active area diameter of, for example, 3 mm. The photo detector can be arranged coaxially with the optical axis and in front of the scattering collector at its nominal focus.

The primary and secondary surfaces are preferably mounted on fixtures using generic mounts indicated by dashed lines 30 and 32, which allow adjustments for translation, tip and tilt, indicated by double ended arrows 34. All elements can be aligned coarsely using an optical rail, not shown.

Figure 2:
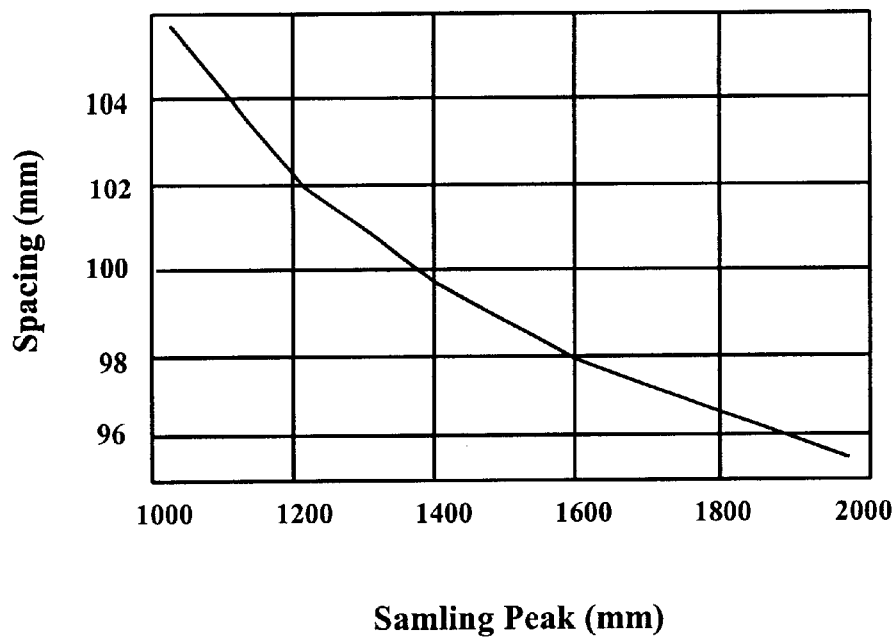
FIG. 2 is a plot of element spacing versus location of peak response of the scattering collector shown in FIG. 1.
Figure 3:
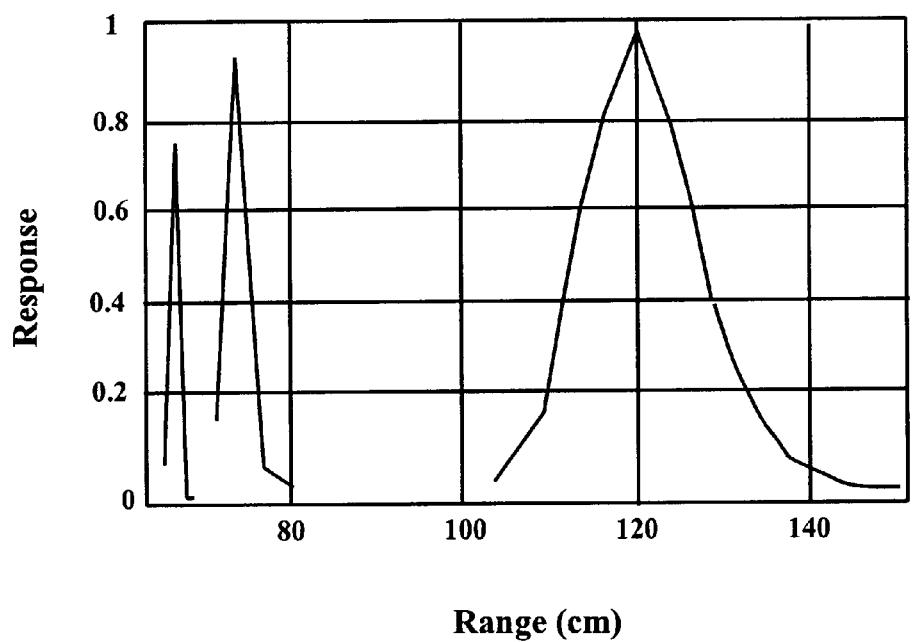
FIG. 3 is a plot of integrated power response at the detector for the scattering collector shown in FIG. 1, optimized for a peak response centered at 120 centimeters (cm)

The focal length of the scattering collector 10 can easily be changed by varying the spacing between the primary and secondary mirrors. Generic means for making such an adjustment is indicated by double ended arrow 36. This adjustment permits the location of the peak of the scattering volume to be changed as a field-selectable option. An exemplary plot of the location of the peak of the scattering volume as a function of element spacing is shown in FIG. 2. It should be noted that a spacing change of slightly more that 1 cm can achieve a 100 cm change in the location of the scattering volume peak. A typical scattering volume centered at 120 cm, and measured with respect to the planar surface of the primary mirror, is shown in FIG. 3.

It can also be seen that two additional conjugates exist that allow light to reach the detector for system solutions consisting of greater than three bounces. These are manifested by the peaks closer to the instrument than the 120 cm peak. For example, the embodiment shown in FIG. 1 also has small response peaks closer to the scattering collector due to five and seven bounce solutions. These additional peaks are not a cause for concern. On the contrary, additional data is obtained, yet the peaks do not occur too close to the instrument such that they interfere with any housings or windows that would be required in the system due to environmental considerations.

The F/1 spherical reflector primary mirror is available as Stock No. E32,827 from Edmund Scientific, Barrington, N.J. The plano-convex BK7 glass lens is available under Part Code KPX232 from Newport Corporation, Irvine, Calif. The entire convex surface of the plano-convex lens can be gold-coated, and a small portion of the coating at the center of the optic can be removed abrasively to allow a light path to the detector.

Figure 4A:
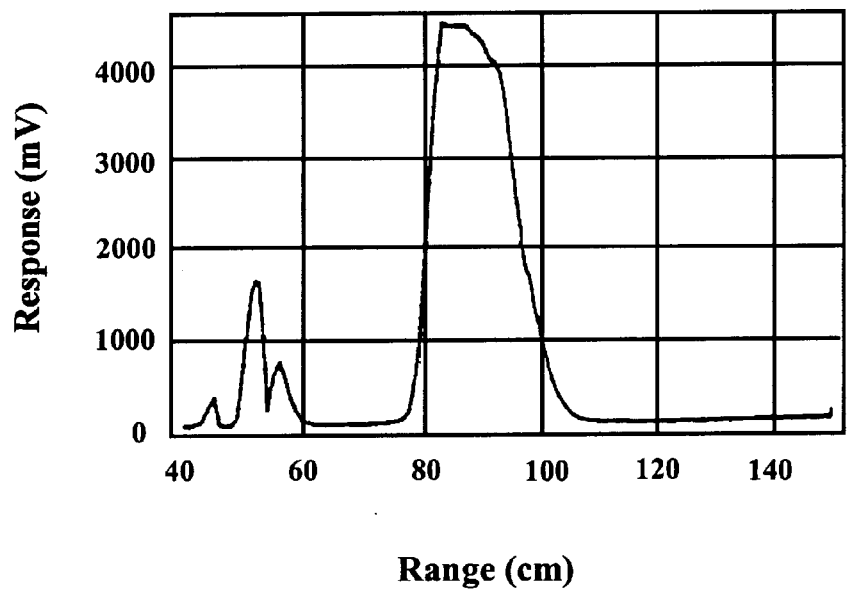
FIGS. 4(a)–4(b) are response plots useful for illustrating the manner in which the scattering volume increases with increased range.
Figure 4B:
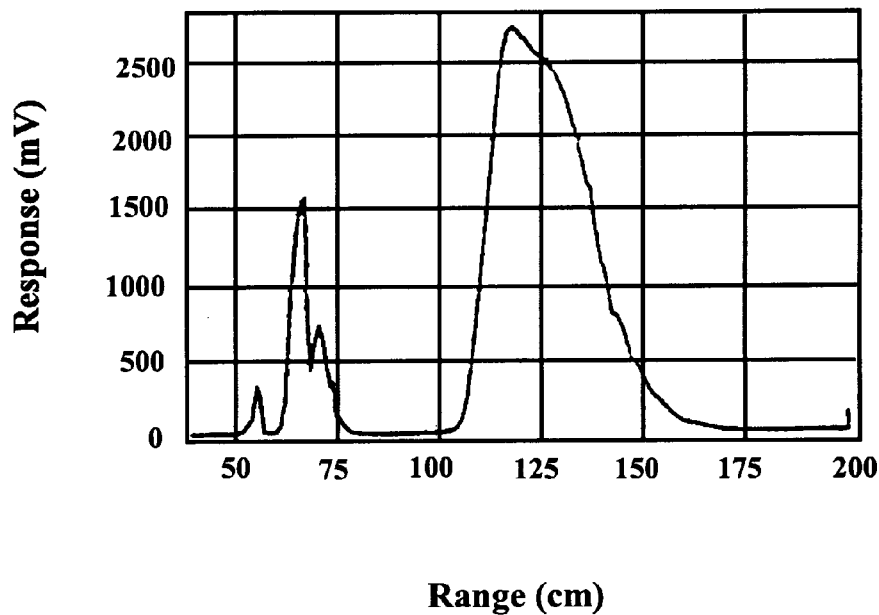

A measure of the scattering volume can be obtained by translating a scattering target along the optical axis and recording the detector signal in units of millivolts (mV). The results are summarized in FIGS. 4($a$)–4($b$). The scattering volume clearly increases with increased range. Multiple peaks in addition to the five and seven bounce results can occur due to improper alignment, which allows even some higher-order solutions to be possible.

Figure 5:
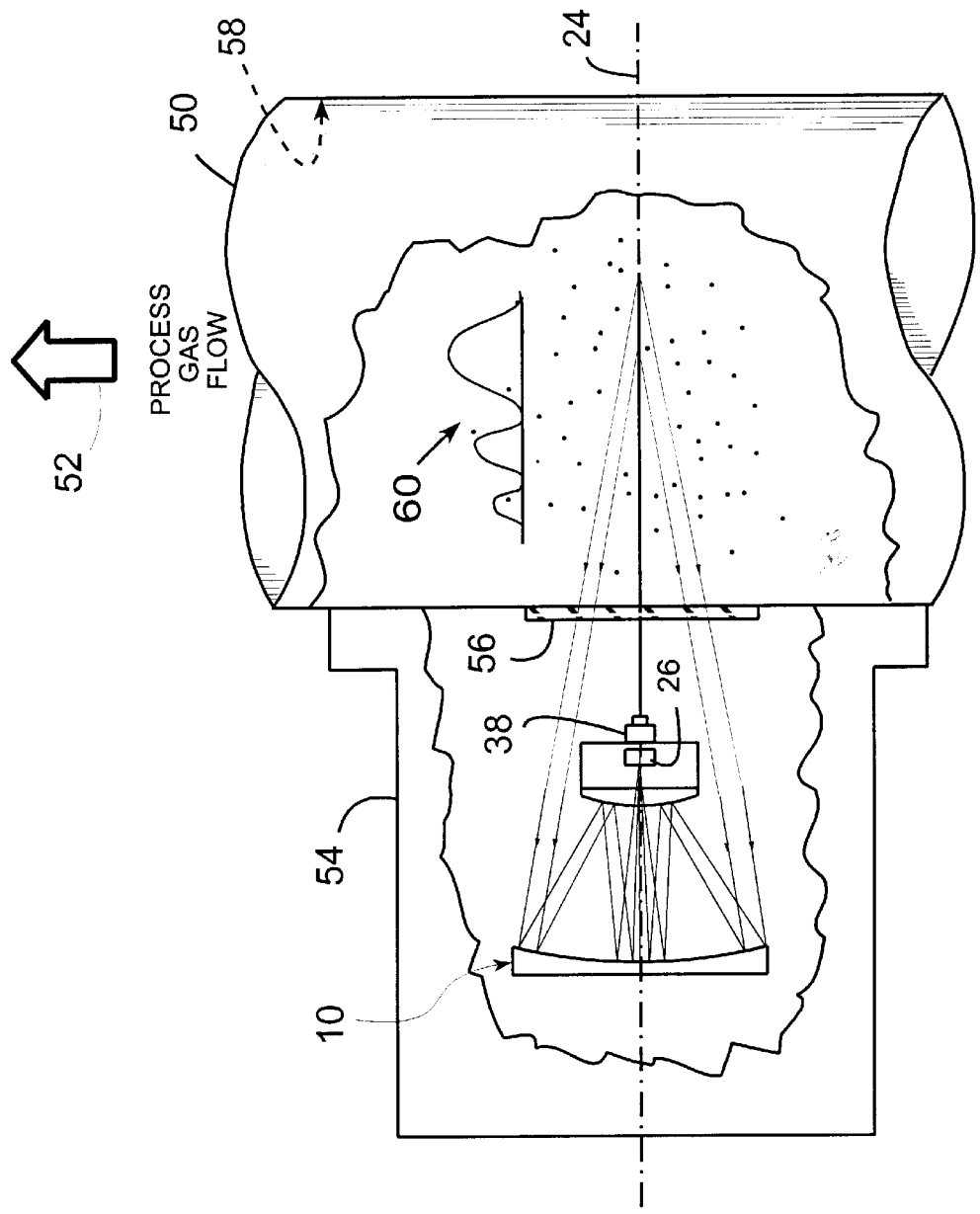
FIG. 5 is a diagrammatic view, partially broken away, of the collector of FIG. 1 installed on a stack for monitoring particulate mass concentration in a process gas flow.

FIG. 5 is a diagrammatic view, partially broken away, of the collector 10 of FIG. 1 installed on a stack for monitoring particulate mass concentration in a process gas flow 52. The collector is mounted in a housing 54 adjacent the stack 50. A window 56 is provided through the wall of the stack in order to permit light from the excitation source laser 38 to enter the stack and in order for back scattered light to leave the stack and enter the collector 10. As can be seen, the laser 38 is disposed between the photo detector 26 and the window 56, within the bounds of the secondary mirror and photo detector, so as not to interfere with the transmission of the back scattered light. A line of particulates across the optical axis is monitored or sampled. Advantageously, back scattering from the far wall 58 of the stack, as determined by the position of the collector 10, is substantially rejected by the collector. A representative scattering response plot 60 is also illustrated.

The novel scattering collector taught herein is based on all spherical reflecting and refracting surfaces, namely a catadioptric zoom scattering collector. A large sampling volume is achieved due to the severe spherical aberration caused by multiple reflections from spherical reflecting surfaces. Moreover, the multiple reflections provide significant rejection of back scattering from the far wall of the stack being monitored. The system can easily be reconfigured for different probe ranges and desired volumes due to its zoom characteristics. This is particularly advantageous when the instrument must be deployed in effluent stacks of varying diameters across an industrial complex. Due to the novel capability to reconfigure the instrument in the field, only one type of instrument needs to be purchased for a variety of stack sizes. This allows a manufacturer to streamline production, improve quality, and increase profits in each unit sold. Lastly, the optical elements required for the scattering collector are readily available, and are relatively inexpensive. Use of such off-the-shelf components can reduce lead times in production and further reduce the cost of manufacturing the zoom scattering collectors.

DETAILED DESCRIPTION OF THE PREFERRED EMBODIMENTS

A scattering collector in accordance with an inventive arrangement uses only spherical surfaces and is adjustable for scattering angle, volume, and peak response. The new scattering collector is based on a multiple-bounce catadioptric telescope and uses commercially-available spherical elements in a mostly reflective configuration. The term "catadioptric" combines the ancient terms "dioptric", which refers to lenses, and "catoptric", which refers to mirrors. Therefore, a catadioptric system is made up of both reflecting and refracting elements. The new collector is similar in some respects to a Cassegrain telescope configuration, but both primary and secondary mirrors are spherical, and the light is subjected to one additional bounce from the primary mirror before being brought to a focus by the uncoated central zone of a plano-convex glass lens that is also used for the secondary mirror. The position of the peak response can be changed by adjusting the spacing between the primary and secondary elements, and for a fixed entrance aperture, this spacing also sets the range of scattering angles accepted by the system and the longitudinal extent of the scattering volume. Additional benefits of the mostly reflective design are compactness and a high rejection of wall yield due to the multiple bounce configuration. A catadioptric system is one which employs both reflective and refractive surfaces. This is strictly true in the case of the new collector, but the refractive surface does not play an important role. Rather, the refractive surface is an artifact due to the construction approach, which substantially utilizes off the shelf components.

The system employs a fast F/1 primary spherical concave reflector and a somewhat slower convex secondary mirror that is in part not reflective. The secondary mirror can be fabricated by evaporative coating a suitably reflective metal, for example gold, onto the convex surface of a plano-convex lens. A small central aperture is left clear so that light can be brought to a focus onto the surface of a photo detector mounted in front of the system along the optical axis.

A volume in space is illuminated, for example with a semiconductor laser beam, that is collimated and also aligned along the optical axis in front of the scattering collector and photo detector. Light scattered from particulates along the optical axis is first collected by the partially obscured F/1 concave spherical reflector forming a primary mirror. The primary mirror then reflects the collected light toward the secondary mirror. The secondary mirror can be a plano-convex lens with an annular reflective coating over part of its surface, the center remaining uncoated and refractive. The secondary mirror can have a diameter of, for example, half the diameter of the primary mirror, although this is not critical ratio. Light is reflected from the secondary mirror to the primary mirror one additional bounce until the light is brought to a focus with the aid of the center of the plano-convex lens that was left uncoated and which has a small amount of refractive power. This is the sole refractive surface in the scattering collector. The detector is positioned close to the rear of the plane surface of the lens.

The multiple bounce reflective structure of the new collector results in many important functional advantages. First, the new collector allows a large volume in space to be probed. Second, the new collector reduces wall yield, that is undesired scattered light from the far stack wall, to practically unmeasurable levels. Third, the new collector eliminates the need for custom designs for emission stacks of varying diameters because its probe volume and peak location may be altered by adjusting the zoom properties. Fourth, the new collector allows scattering excitation sources to be changed in wavelength because the mostly reflective configuration does not suffer greatly from dispersion.

The multiple bounce reflective structure of the new collector also results in many important structural advantages, the difference between functional and structural advantages being somewhat arbitrary and made for purposes of convenience in description. First, there is no penalty for the obstruction caused by the secondary mirror, since an obstruction is necessary to limit the angular spread of rays that can be admitted to the system. Second, the multiple reflections result in a more compact instrument, which helps in mechanical and thermal stability. Third, the focal length may be zoomed and changed easily in real time by changing the spacing between the primary and secondary mirrors by a relatively small increment. The multiple bounces mean that only a small change in element spacing is required to effect a large change in focal length. Fourth, the system is practically achromatic since nearly all of the optical power resides in the reflective elements, which have no dispersion. Although there is one refractive surface, most of the power is in the reflective portion of the instrument, and the dispersive effects of central portion of the glass lens are negligible. Fifth, the new collector reduces the high costs usually associated with manufacturing precision optical instruments by utilizing readily available, off-the-shelf optical elements.

What is claimed is:

1. A back scattering collector, comprising:

a first spherical reflective surface;

a second spherical reflective surface having a generally annular form, said annular form defining a central aperture;

a refractive element, said first and second reflective surfaces and said refractive element being aligned along an optical axis;

a light excitation source for illuminating a volume for analysis;

said first and second reflective surfaces having respective diameters which reflect light rays back scattered from said volume at least three times between said first and second reflective surfaces, a last one of said at least three refections directing said light rays through said refractive element; and, a photo detector, said refractive element focusing said light reflected light rays onto said photo detector.

2. The collector of claim 1, wherein said first and second reflective surfaces and said refractive element have respective centers of curvature lying substantially on said axis.

3. The collector of claim 2, wherein said first and second reflective surfaces have respective centers of curvature on a side of said second reflective surface opposite said first reflective surface.

4. The collector of claim 3, comprising a plano-convex lens having plane and convex sides, said second reflective surface being formed on said convex side of said lens and said refractive element being formed by a central portion of said lens.

5. The collector of claim 2, wherein said diameter of said first reflective surface is substantially twice as long as said diameter of said second reflective surface.

6. The collector of claim 5, comprising a plano-convex lens having plane and convex sides, said second reflective surface being formed on said convex side of said lens and said refractive element being formed by a central portion of said lens.

7. The collector of claim 2, comprising a plano-convex lens having plane and convex sides, said second reflective surface being formed on said convex side of said lens and said refractive element being formed by a central portion of said lens.

8. The collector of claim 1, wherein said first and second reflective surfaces have respective centers of curvature on a side of said second reflective surface opposite said first reflective surface.

9. The collector of claim 8, wherein said diameter of said first reflective surface is substantially twice as long as said diameter of said second reflective surface.

10. The collector of claim 9, comprising a piano-convex lens having plane and convex sides, said second reflective surface being formed on said convex side of said lens and said refractive element being formed by a central portion of said lens.

11. The collector of claim 8, comprising a piano-convex lens having plane and convex sides, said second reflective surface being formed on said convex side of said lens and said refractive element being formed by a central portion of said lens.

12. The collector of claim 1, wherein said diameter of said first reflective surface is substantially twice as long as said diameter of said second reflective surface.

13. The collector of claim 12, comprising a plano-convex lens having plane and convex sides; said second reflective surface being formed on said convex side of said lens and said refractive element being formed by a central portion of said lens.

14. The collector of claim 1, comprising a plano-convex lens having plane and convex sides, said second reflective surface being formed on said convex side of said lens and said refractive element being formed by a central portion of said lens.

15. The collector of claim 1, further comprising means for adjusting a separation distance between said first and second reflective surfaces.

16. The collector of claim 1, wherein said excitation source comprises a laser.

17. The collector of claim 1, wherein said excitation source comprises a semiconductor laser.

* * * * *